US006587895B1

(12) United States Patent
Golovchinsky et al.

(10) Patent No.: US 6,587,895 B1
(45) Date of Patent: Jul. 1, 2003

(54) METHOD FOR ACCEPTING A FREEFORM INPUT CONTAINING MESSAGE WITH TIME REFERENCE THEREUPON PROVIDING AN ALERT MESSAGE ACCORDING TO THE TIME REFERENCE

(75) Inventors: Gene Golovchinsky, Palo Alto, CA (US); Morgan N. Price, Palo Alto, CA (US); William N. Schilit, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/366,498

(22) Filed: Aug. 3, 1999

(51) Int. Cl.$^7$ .............................. G06F 3/00; G06F 13/12
(52) U.S. Cl. ............................................ 710/12; 710/73
(58) Field of Search ....................................... 710/12, 73

(56) References Cited

U.S. PATENT DOCUMENTS

| | | | |
|---|---|---|---|
| 4,715,010 A | 12/1987 | Inoue | 364/705 |
| 4,890,258 A | 12/1989 | Tsugei | 364/900 |
| 5,181,255 A * | 1/1993 | Bloomberg | 382/176 |
| 5,603,054 A | 2/1997 | Theimer et al. | 395/826 |
| 5,625,377 A | 4/1997 | Jenson | 345/146 |
| 5,692,073 A | 11/1997 | Cass | 382/219 |
| 5,864,848 A * | 1/1999 | Horvitz et al. | 707/102 |

FOREIGN PATENT DOCUMENTS

| | | | |
|---|---|---|---|
| EP | 0 681 250 A2 | 11/1995 | G06F/17/60 |
| EP | 0 704 808 A2 | 4/1996 | G06F/17/24 |
| EP | 833254 A2 * | 4/1998 | G06F/15/02 |
| EP | 0 851 372 A2 | 7/1998 | G06F/17/60 |
| EP | 0 929 046 A2 | 7/1999 | G06F/17/60 |
| EP | 0 977 134 A2 | 2/2000 | G06F/17/30 |
| EP | 1 014 286 A2 | 6/2000 | G06F/17/60 |
| WO | WO 98/37478 | 8/1998 | |

OTHER PUBLICATIONS

U.S. patent application Ser. No. 08/929,426, Schilit et al., filed Sep. 15, 1997.
U.S. patent application Ser. No. 08/929,427, Schilit et al., filed Sep. 15, 1997.
U.S. patent application Ser. No. 09/094,730, Price et al., filed Jun. 15, 1998.
U.S. patent application Ser. No. 09/100,041, Schilit et al., filed Jun. 19, 1998.
Kullberg, R.L. (May, 1995) "Mark Your Calendar! Learning Personalized Annotation from Integrated Sketch and Speech," In CHI'95 Conference Companion, ACM Press, 1995, pp. 302–303.
Silverman, B.G. (1997) "Computer Reminders and Alerts," IEEE Computer, 30, 1 (Jan., 1997), pp. 42–49.
Schilit, B.N., Golovchinsky, G., Price, M., "Beyond Paper: Supporting Active Reading with Free Form Digital Ink Annotations," In Proceedings of ACM CHI98, (Los Angeles, CA, Apr. 19–24), pp. 249–256.

* cited by examiner

Primary Examiner—Thomas Lee
Assistant Examiner—Suresh K Suryawanshi
(74) Attorney, Agent, or Firm—Fliesler, Dubb, Meyer & Lovejoy LLP

(57) ABSTRACT

A method and apparatus for generating reminder messages based on a freeform input is disclosed. In one embodiment, freeform inputs are handwritten annotations on paper that are scanned into a computer system. Based on information contained in the freeform input, the system creates a reminder message and transmits it in response to a time reference contained in the freeform input. In an alternative embodiment, freeform digital ink inputs may be directly entered into a pen computer system via a stylus. Reminder messages may be delivered over a computer display, facsimile device, via email, telephone or portable paging device.

30 Claims, 7 Drawing Sheets

| | Mon. Tue. Wed. (Thurs.) Fri. Sat. Sun. | Feb. 2 |
|---|---|---|
| | 6 | |
| | 7 | |
| | 8 | |
| | 9 | |
| | 10 | |
| | 11 | |
| | 12PM | Lunch with Chelsea at Heros |
| | 1 | |
| | 2 | |
| | 3 | |
| | 4 | |
| | 5 | |
| | 6 | |
| | 7 | |
| | 8 | |
| | 9 | |

FIG. 3

METHOD FOR ACCEPTING A FREEFORM INPUT CONTAINING MESSAGE WITH TIME REFERENCE THEREUPON PROVIDING AN ALERT MESSAGE ACCORDING TO THE TIME REFERENCE

RELATED APPLICATIONS

U.S. patent application Ser. No. 09/094,730, A Method and System for Creating Ad Hoc Links From Freeform Ink, discloses a paper-like hypertext system that supports reading and browsing and creates ad hoc links between passages in documents using user-specified freeform ink annotations. However, it does not disclose a system for generating reminder messages based on freeform inputs.

U.S. Pat. No. 6,279,014, A Method and System for Organizing Documents Based on Annotations in Context, discloses a method and system for organizing documents based on freeform annotations made to the documents. However, it does not disclose a system for generating reminder messages based on freeform inputs.

FIELD OF THE INVENTION

The present invention relates generally to a schedule organizing system. In particular, the present invention relates to a method and apparatus for generating messages based on freeform input supplied by a user.

BACKGROUND OF THE INVENTION

People often require the use of organizational tools to help manage schedules and to keep track of appointments and other events. A paper calendar is a common example of such an organizational tool. A person may write on the calendar the date and time of each entry. The person can also denote reminders related to the entry, thus providing sufficient lead time to prepare for a scheduled event. Day timers are another example of a paper-based organizational tool. Day timers keep track of names, appointments, and lists of "to do items," and often employ a calendar system. As with the common paper calendar, day timers are very easy to use: the person makes notes on the appropriate page or calendar entry. Lead times are also easily provided by placing reminders on preceding pages. Both systems share the advantages of a large, dedicated space to show notes and annotations, portability, and the use of handwritten annotations. However, one disadvantage of paper-based organizational tools is that they do not provide an automatic reminder mechanism. The time to go to a meeting can easily slip by though they entered the event in a calendar or daytime and included a lead time reminder.

Electronic calendars provide a different approach to schedule organization. Electronic calendars run on desktop, laptop, and other computers. The main advantage of electronic calendars is that they provide an automatic reminder mechanism. They may program the computer to display a calendar entry such as an appointment or reminder entry at a designated time. Without any additional action by the user, the reminder message automatically appears on the computer screen at a designated time. The main disadvantage is that operating an electronic calendar organizing system requires a lot of effort: select time, enter event description text, select options, etc. There is no facility for a user to enter freeform input, such as a handwritten annotation. Similarly, an electronic calendar system does not work when a laptop computer is turned off.

There is a need for a schedule organizing system that provides the simplicity of freeform annotation of paper-based systems with the automatic reminder mechanism of electronic calendars.

SUMMARY OF THE INVENTION

In an embodiment of the present invention a method and apparatus for generating reminder messages based on a freeform input received from a user is provided. Annotations can be made by hand to a paper calendar and scanned into a computer system. Based on the freeform annotation, the system automatically schedules and issues the corresponding reminder messages without any additional user interaction. In an alternative embodiment, freeform digital ink annotations may be directly entered into the system via a pen computer interface.

In one aspect, an embodiment of the present invention provides a method for providing an alert based on freeform input, comprising the steps of accepting a freeform input, where the input contains message information and a time reference when a reminder message is to be provided; extracting the message information and time reference from the freeform input; and providing the alert responsive to the time reference.

In another aspect, an embodiment of the present invention provides a system for providing an alert based on a freeform input, the system comprising a receiving device for receiving a freeform input, the freeform input containing message information and a time reference for delivery of said message; a processor coupled to the receiving device for extracting the message information and time reference from the freeform input; and an alerting device for providing an alert to the user in response to said time reference.

In another aspect, an embodiment of the present invention provides a computer readable storage medium for use with a computer apparatus, wherein the medium includes computer instructions which, when executed by said computer apparatus: receive a freeform input which includes message information and a time reference; extract information from the freeform input; and provide an alert responsive to the time reference.

Other features and benefits of the present invention will be apparent from the detailed description of the invention when considered with the accompanying drawings.

BRIEF DESCRIPTION OF THE DRAWINGS

The present invention will be described with respect to particular embodiments thereof, and reference will be made to the drawings in which:

FIG. 3 is an illustration of a page from a paper calendar that may be used as an input with the present invention;

DETAILED DESCRIPTION

Figure 1:
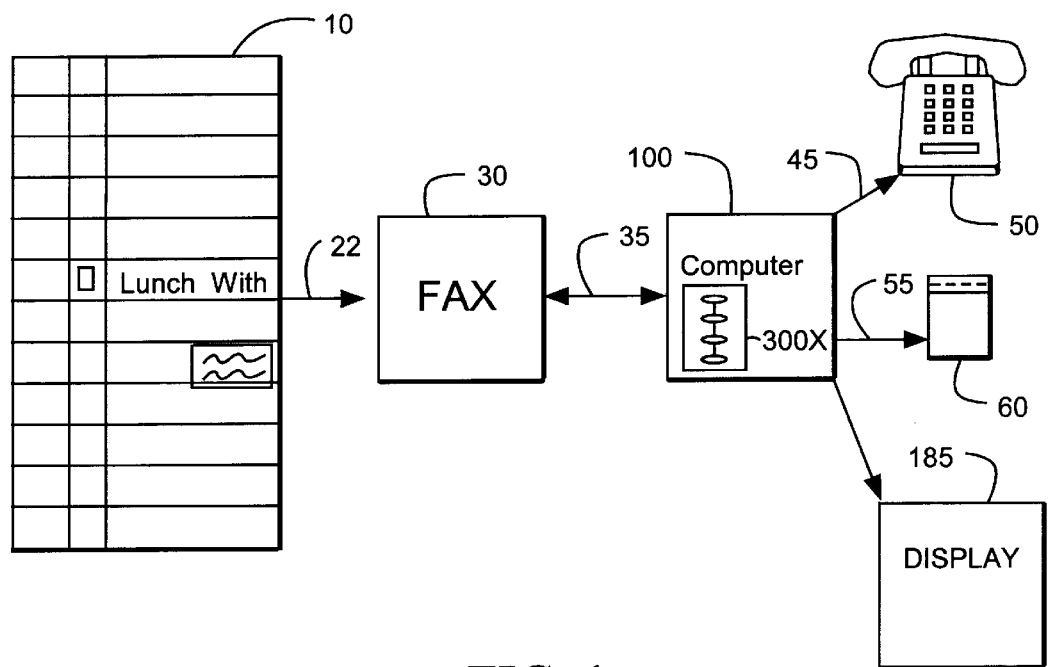
FIG. 1 illustrates the major components of an embodiment of the present invention and associated devices.

Directing attention to FIG. 1, in one preferred embodiment, the present invention allows the user to schedule appointments on a paper calender 10 and input them to a computer system 100 via a scanner or facsimile device 30. Scanner device 30 communicates with the computer system 100 via communication medium 35. The computer system 100 is a general purpose computer that generates an alert in the form of a reminder message. The reminder message is based on annotation 22 on calender page 10 and is sent at a time indicated on calender page 10. A typical general purpose computer will be discussed below. As used herein, the term "freeform input" refers to idiosyncratic marks, such as hand-written annotations. When displaying the message on the display 185, the freeform input 22 is reproduced on the display 185. The reminder message may also be presented to the user via telephony devices such as a facsimile device 30, or portable pager 60 via communication medium 55.

Besides displaying the freeform input 22, an embodiment of the present invention may also utilize a handwriting recognition algorithm which recognizes the handwritten characters and forms a corresponding auditory reminder message. Handwriting recognition algorithms are widely known by those skilled in the art and need not be disclosed herein. When an auditory reminder message is created, the computer system 100 may send the reminder message via communication medium 45 to telephone 50, or by an audio system 150 incorporated in computer system 100.

Figure 2A:
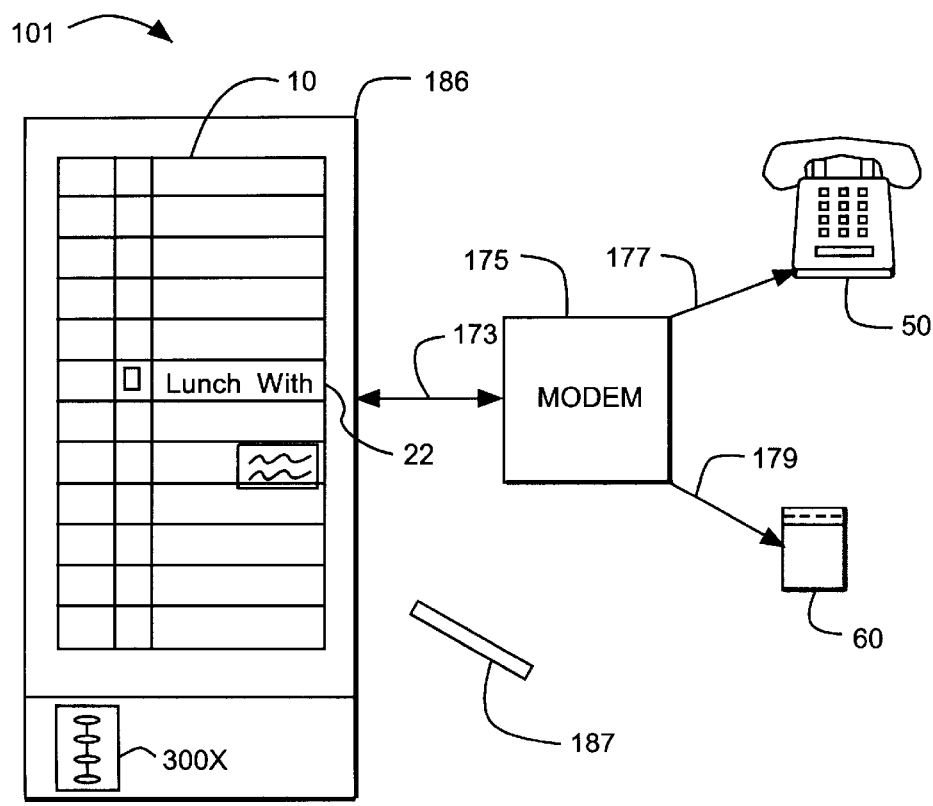
FIGS. 2A and 2B illustrate an embodiment of the present invention implemented on a pen-based computer.
Figure 2B:
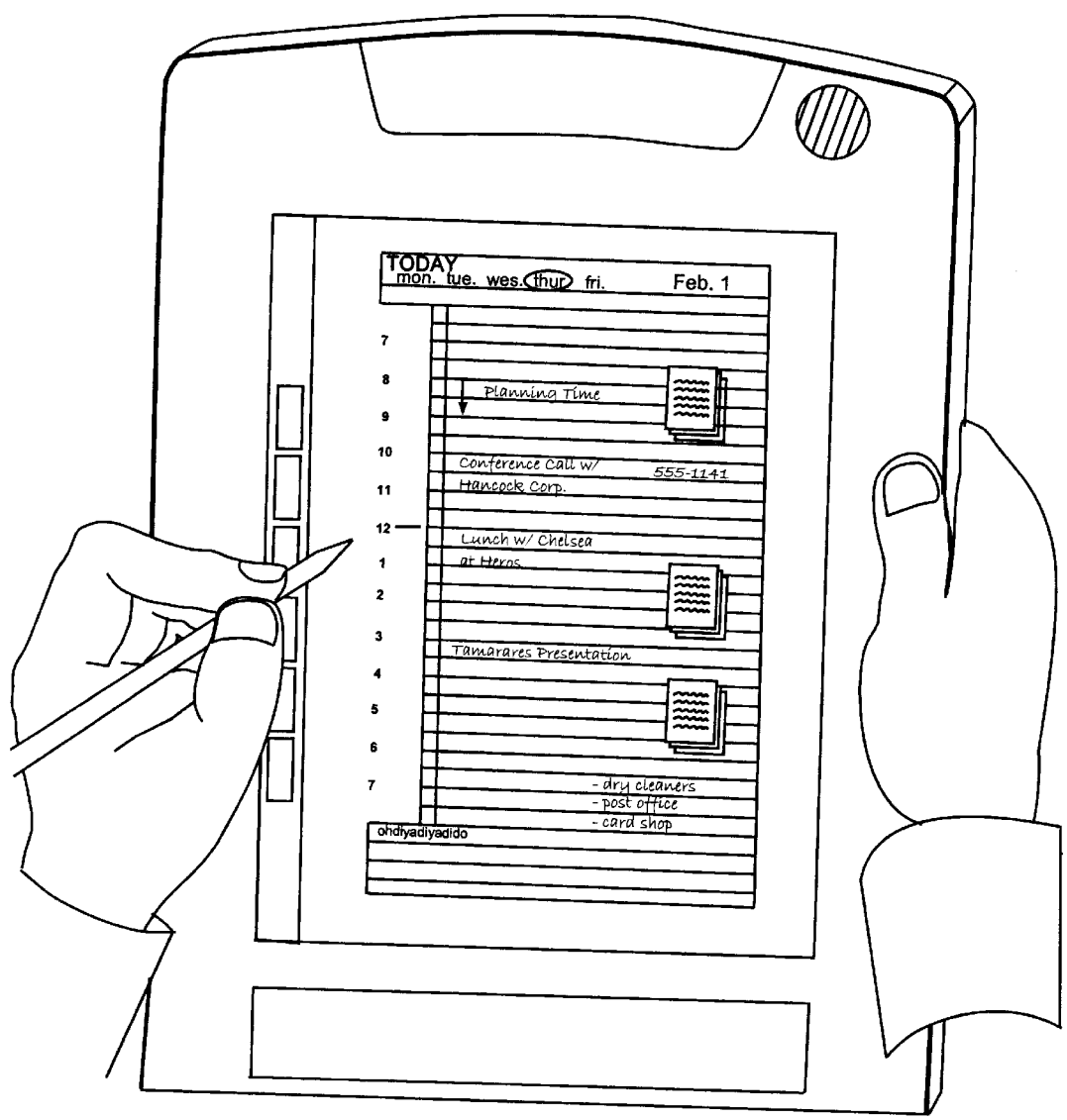

In an alternative preferred embodiment (FIGS. 2A and 2B), the present invention may also utilize a touch-screen or pen-based computer system 101. Pen-based computer systems present a familiar paper-like interface to an electronic calendar. In a pen-based computer system such as system 101, the user writes with a stylus 187 directly on display 186. The computer system 101 senses the location and the positions traversed as the stylus 187 moves across the display 186 and assigns "digital ink" marks that correspond with the positions of the stylus 187. As used herein, the term "digital ink" refers to traces that appear on the computer display 186, namely collections of pixels that are darkened or colored to represent the strokes that the user made with a stylus. In this alternative preferred embodiment, a page similar to the paper calendar is reproduced on the display 186 and the user may make freeform annotations directly to it via the stylus 187.

FIG. 3 illustrates a typical calendar form 10 containing freeform annotations. Date 14 may also be included at the top of the page. In column 16, various times of the day are listed, allowing a user to organize appointments or other events throughout the day. Column 18 provides a space for the user to place a dash or callout symbol that flags that time of day for a reminder message. Adjacent to column 18 is column 20, which allows space for reminder notes. An example is input 22, entered in the space corresponding to 12 p.m. on Thursday, February 2nd. In this illustration, the freeform input 22, "lunch with Chelsea" is placed to the right of a dash in column 18, which causes at 12 p.m. on February 2nd a reminder message containing the words "lunch with Chelsea" to be displayed on the computer display 185 or output to other devices discussed above.

Where the reminder message is output to computer display 185 or the display 186 on a pen-based computer system 101, the user may also associate other documents with the reminder message. For instance, in the example of the "lunch with Chelsea" reminder message, a user may wish to remind himself of a list of notes to be discussed during lunch. If the user had prepared the list of notes and either scanned or faxed them into the system or prepared the document on a word processor, the user may associate that document with the 12 p.m. timeslot by placing an icon 24 on the image of the calendar page 10 stored in the computer system 100 (or computer system 101). When the reminder message is displayed at the appropriate time on the computer display 185, the document or a link to it can be displayed as well.

Figure 4:
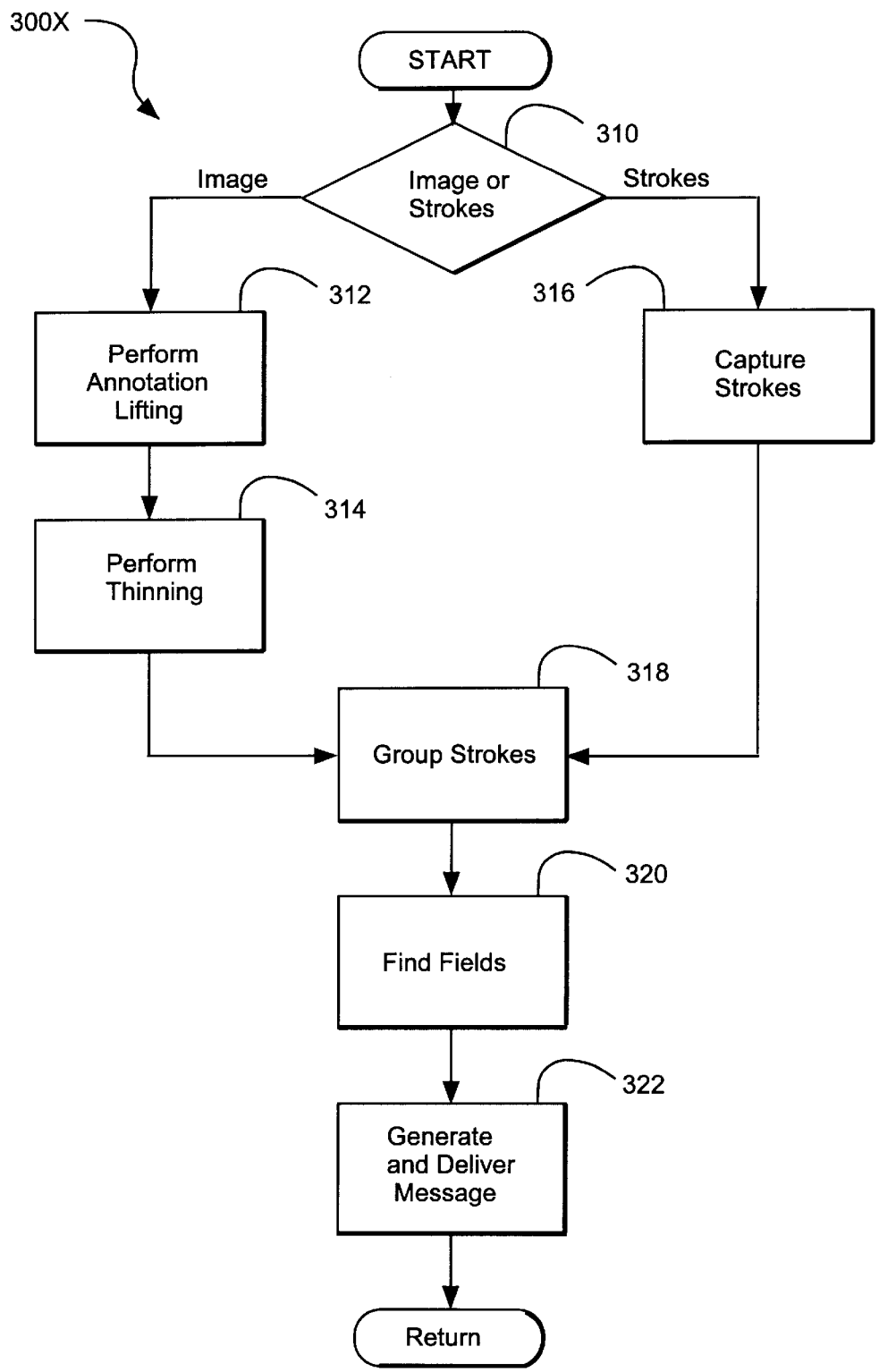
FIG. 4 is a flow chart illustrating the logical sequence of steps performed to achieve stroke grouping in an embodiment of the present invention.

The present invention executes program 300X to issue a reminder message based on a freeform input. Directing attention to FIG. 4, at step 310, the program 300X determines whether the freeform input is a scanned image or strokes on a pen computer 187. If it is a scanned image, control proceeds to step 312, where annotation lifting is performed. Annotation lifting refers to the extraction of the freeform input from the scanned image. Annotation lifting converts the scanned image, which contains both the printed calendar page 10 and the freeform input 22, into an image containing only the freeform input. The logic of the annotation lifting implemented here is similar to the extraction algorithm described in U.S. Pat. No. 5,692,073, Formless Forms and Paper Web Using a Reference-Based Mark Extraction Technique, which is herein incorporated by reference in its entirety. Once the annotation lifting step 312 has been performed, program control continues to step 314, where thinning is performed on the extracted freeform input. Thinning is a process wherein an image is converted into a list of lines or curve segments, and features in the image that do not form lines or curve segments are ignored as noise. Each curve segment is equivalent to a stroke, except that the direction assigned is arbitrary and there is no timing information. Furthermore, the ordering of the curve segments is arbitrary, whereas the order of strokes in a pen-based computer 101 is implicit in the user's actions. Thinning is known to those skilled in the art and need not be described herein.

Directing attention back to step 310, if the input mode is strokes made on a pen computer 187 with a stylus 101, control proceeds to step 316, where the strokes are captured to the pen computer 187.

Once the freeform input has been obtained through either of the methods described above, control proceeds to step 318, where the individual strokes are grouped together. As used herein, a stroke refers to the stroke of a stylus or a curve segment produced by thinning, and may be represented in a computer as a series of connected dots. Stroke grouping is known to those skilled in the art and need not be discussed herein. Once stroke grouping is performed, control proceeds to step 320, where field finding is performed. As used herein, a "field" is a logical structure that corresponds to a two dimensional region on the form. The field finding process detects the appropriate field that is associated with the stroke groups. Step 320 is described in greater detail in FIG. 5.

After the field finding step 320 is performed, control proceeds to step 322, where the message is generated and delivered.

Figure 5:
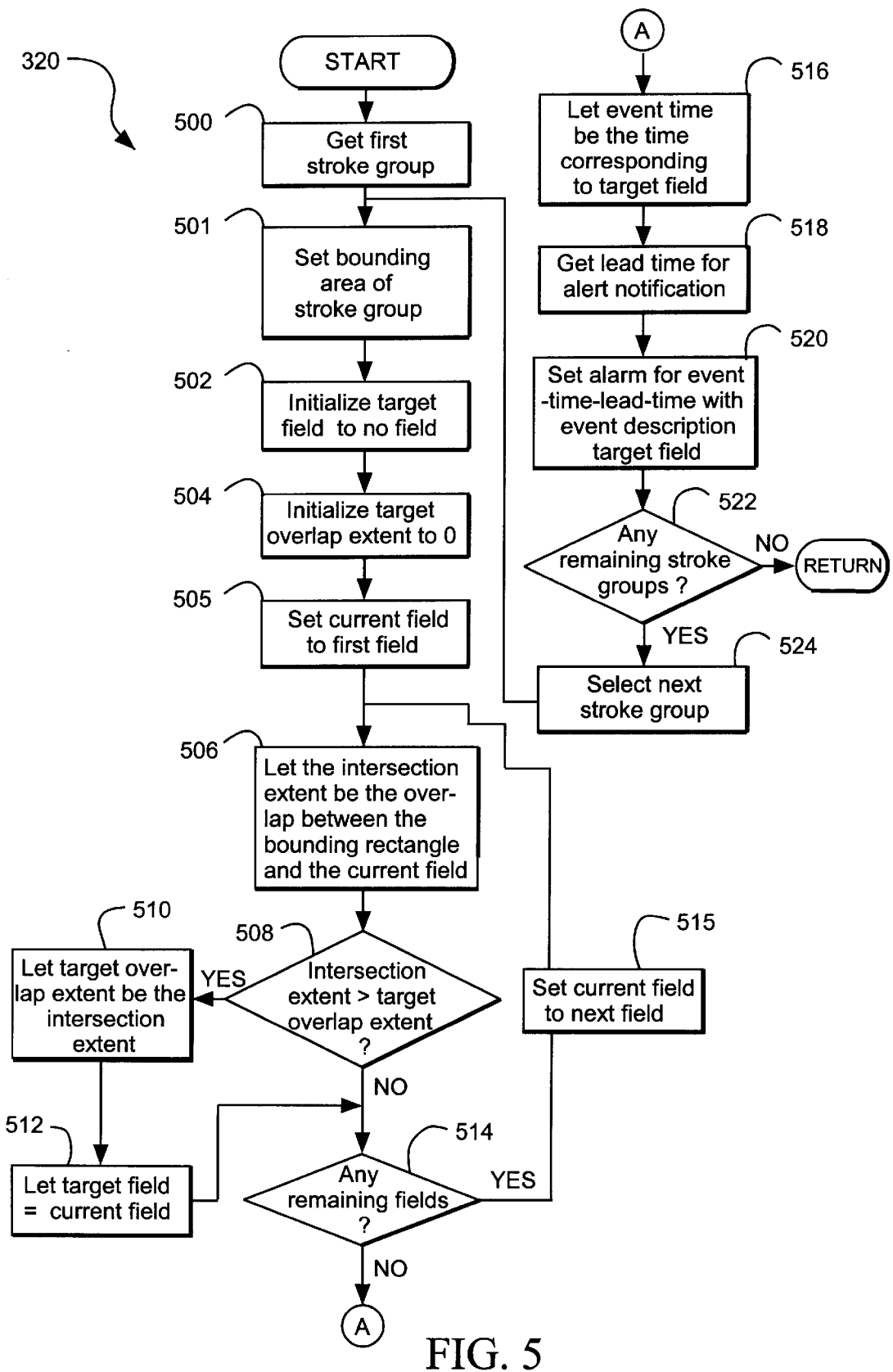
FIG. 5 is a flow chart illustrating the logical sequence of steps required to perform the field finding function of the present invention.

FIG. 5 shows the logical sequence of steps executed to find fields corresponding to the freeform input. At step 500, the first stroke group is obtained. At step 501, abounding rectangle is defined to be the area surrounding the stroke group. At step 502, the target field is initialized. A target field is a variable that represents a field that received some strokes belonging to the freeform input. Continuing to step 504, a target overlap is initialized. A target overlap is a variable that represents the amount of overlap between the bounding area containing the stroke and the area of the field. Control continues to step 505, where the current field is set to the first field. Continuing to step 506, an additional variable, intersection extent, is set to the extent of the intersection between the bounding rectangle and the area of the current field. At step 508, the intersection extent is compared to the target overlap extent. If the intersection extent is greater than the target overlap extent, control proceeds to step 510 where the target overlap extent is set to the value of the intersection extent, and the target field is set to the current field (step 512). Control then proceeds to step 514, where a check is made for any remaining fields. If there are remaining fields, the current field is set to the next field (step 515), and control returns to step 506. Otherwise, control continues to step 516, where the event time is given the value corresponding to the target field. The time value is taken from the field in column 16 corresponding to the target field in column 20 (FIG. 2). If multiple lines are needed for the message in column 20, a mark may be placed in column 18 corresponding to the desired time reference in column 16. Control continues to step 518, where the lead time for the reminder message is obtained. The lead time is the time that the user indicates a first alert is to be issued, before the event time, thus allowing the user a sufficient amount of time to prepare for the upcoming event. The lead time may be designated by the user by marking in column 18 (FIG. 3). The vertical extent and the shape of the mark may be used to determine the lead time. Continuing to step 520, the freeform input 22 is checked for any additional stroke groups. If any are found, control proceeds to step 524, where the next stroke group is selected. Control returns to step 501.

Figure 6:
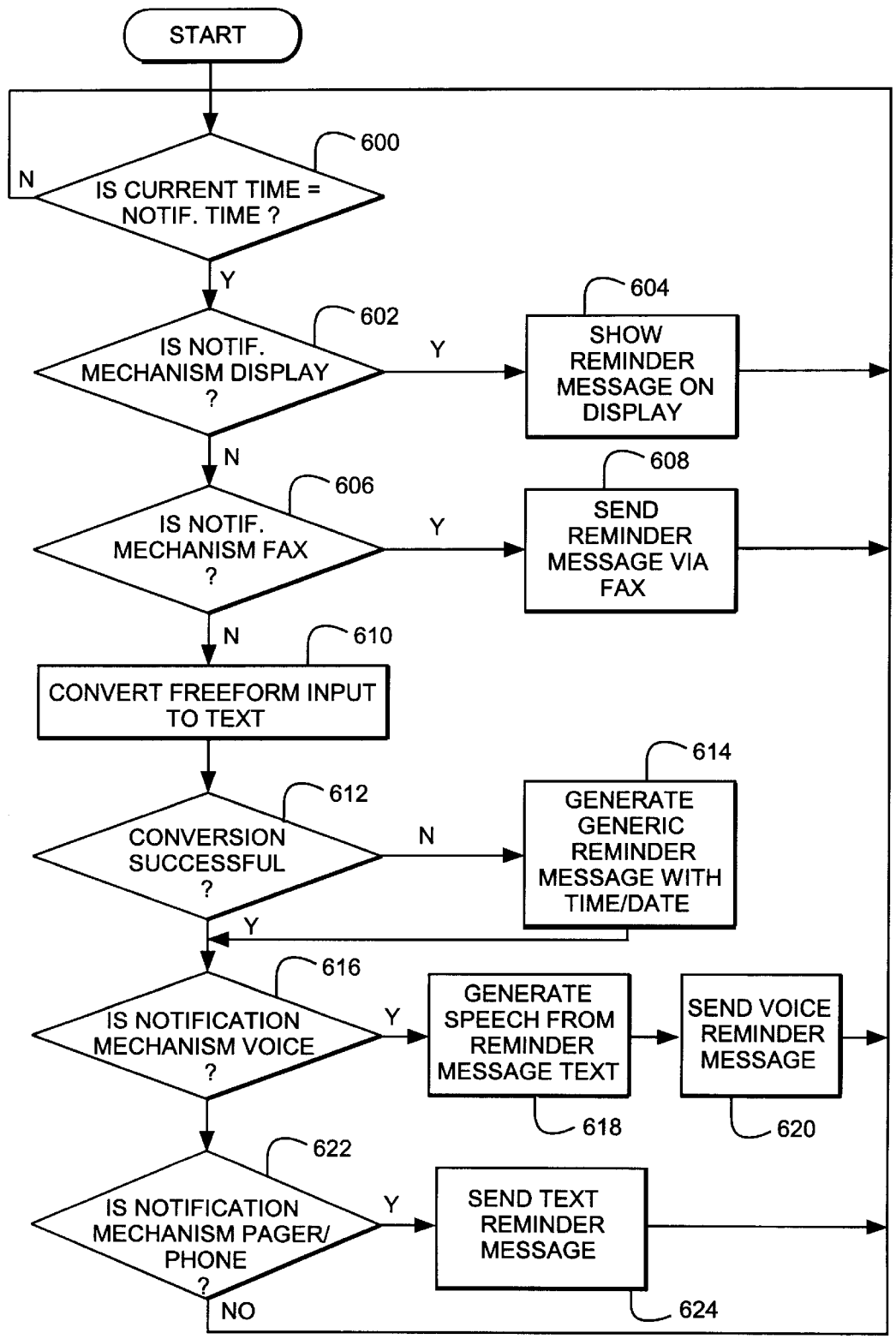
FIG. 6 is a flow chart illustrating the logical sequence of steps required to perform the reminder message function of the present invention.

Messages are generated as described in FIG. 6. Beginning at step 600 the clock 165 is polled periodically until it is time to produce a reminder message. At the time the user is to be notified, the method of delivery is determined. Where the notification mechanism is the display device of a computer system (step 602) such as display 185, display 186, or any other graphics display, control proceeds to step 604, where the reminder message is shown on the display device. This may also include sending the reminder message through a network to another computer, via e-mail or other suitable communications medium. Control then returns to step 600. If the notification mechanism is facsimile device 30 (step 606) control proceeds to step 608, where the reminder message clipped from the calendar page 10 along with the event time is transmitted to facsimile device 30. Control then returns to step 600. With reference to step 606, If the delivery mechanism is not facsimile, control proceeds to step 610, where freeform input 22 corresponding to the reminder message is converted to equivalent ASCII characters using handwriting recognition algorithms that are known in the art. If the conversion is successful (step 612), control proceeds to step 616. If the conversion is not successful (step 612), control proceeds to step 614 where a generic reminder message is generated based on the time of event, and control transitions to step 616. If the delivery mechanism is voice-based, such as telephone 50, control proceeds to step 618, where voice is generated from the ASCII characters. Control then proceeds to step 620 where the voice message is sent. Control then returns to step 600. Directing attention back to step 616, if the delivery mechanism is not voice, control proceeds to step 622. If delivery mechanism is a telephony device such as a telephone 50 or pager 60 that is capable of communicating visual text (step 606), control proceeds to step 624 where the message is delivered to the telephony device. Control then returns to step 600.

Figure 7:
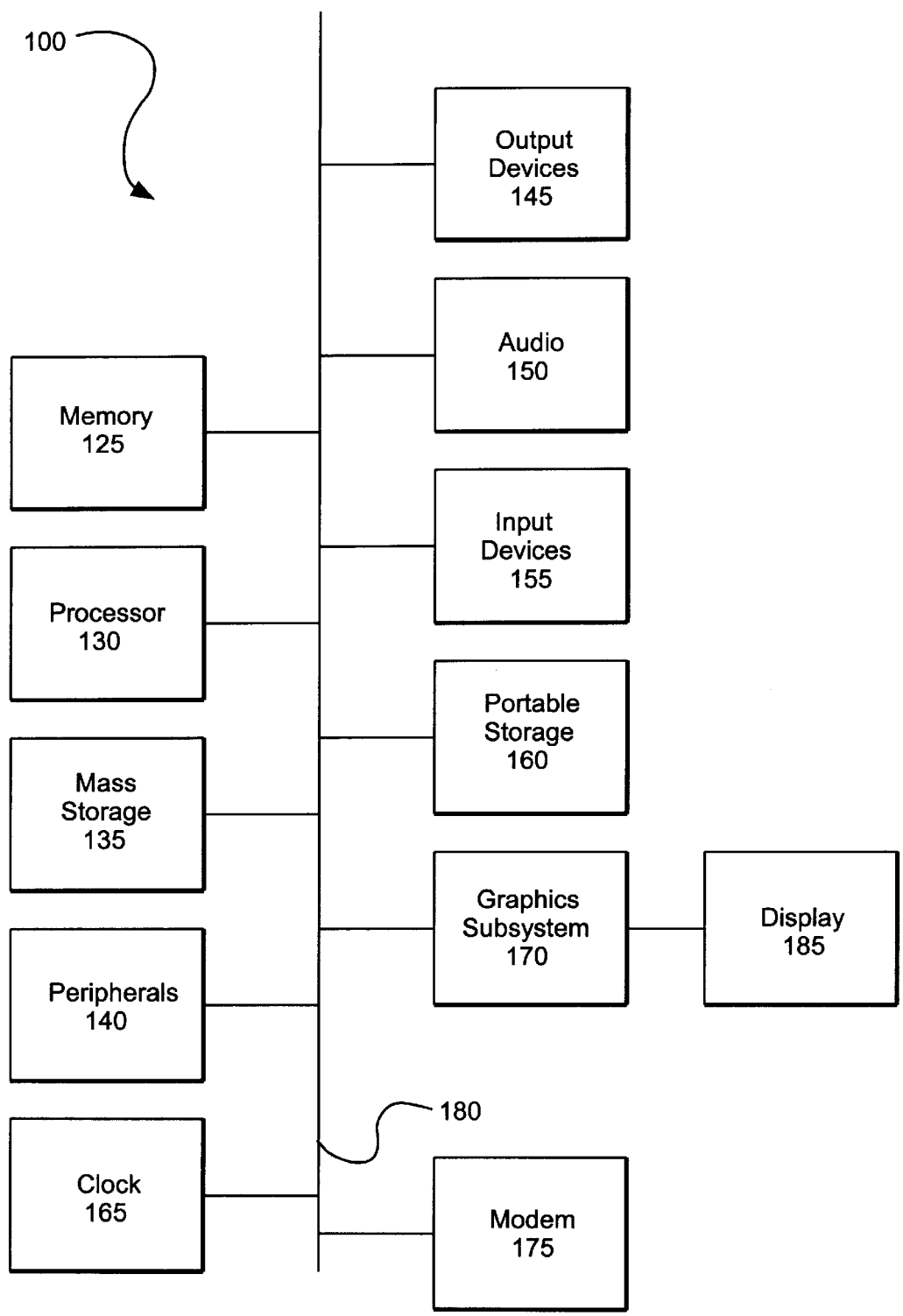
FIG. 7 is a block diagram illustrating the major components of a computer system utilized by the present invention.

FIG. 7 is high-level block diagram view of an embodiment of a computer system having a computer program that causes the computer system to perform the method of the present invention. The computer system 146 includes a processor 130 and memory 125. Processor 130 may contain a single microprocessor, or may contain a plurality of microprocessors for configuring the computer system as a multi-processor system. Memory 125, stores, in part, instructions and data for execution by processor 130. If the system of the present invention is wholly or partially implemented in software, including a computer program 300X, memory 125 stores the executable code when in operation. Memory 125 may include banks of dynamic random access memory (DRAM) as well as high speed cache memory. The system 100 further includes a mass storage device 135, peripheral device(s) 140, input device(s) 155, portable storage medium drive(s) 160, a graphics subsystem 170 and a display 185. In FIG. 1B, display 186 is substituted for display 185 and stylus 187 is substituted for input device 155. For simplicity, the components shown in FIG. 7 are depicted as being connected via a single bus 180. However, the components may be connected through one or more data transport means. For example, processor 130 and memory 125 may be connected via a local microprocessor bus, and the mass storage device 135, peripheral device(s) 140, portable storage medium drive(s) 160, and graphics subsystem 170 may be connected via one or more input/output (I/O) buses. Mass storage device 135, which is typically implemented with a magnetic disk drive or an optical disk drive, is a non-volatile storage device for storing data and instructions for use by processor 130. The method of the present invention also may be stored in processor 130. Portable storage medium drive 160 operates in conjunction with a portable non-volatile storage medium, such as a floppy disk, or other computer-readable medium, to input and output data and code to and from the computer system 100. In one embodiment, the method of the present invention is stored on such a portable medium, and is input to the computer system 100 via the portable storage medium drive 160. Peripheral device(s) 140 may include any type of computer support device, such as an input/output (I/O) interface, to add additional functionality to the computer system 100. For example, peripheral device(s) 140 may include a network interface card for interfacing computer system 100 to a network, a modem, and the like. Input device(s) 155 provide a portion of a user interface. Input device(s) 155 may include an alpha-numeric keypad for inputting alpha-numeric and other key information, or a pointing device, such as a mouse, a trackball, stylus or cursor direction keys. In order to display textual and graphical information, the computer system 100 includes graphics subsystem 170 and display 185. Display 185 may include a cathode ray tube (CRT) display, liquid crystal display (LCD), other suitable display devices, or means for displaying, that enables a user to interact with the computer program. Graphics subsystem 170 receives textual and graphical information and processes the information for output to display 185. Additionally, the system 100 may include output devices 145. Examples of suitable output devices include speakers, printers, and the like. The devices contained in the computer system 100 are those typically found in general purpose computer systems, and are intended to represent a broad category of such computer components that are well known in the art. The computer system of FIG. 7 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, workstations, mainframes, and the like. Alternative embodiments of the use of the method of the present invention in conjunction with the computer system 100 further include using other display means, such as CRT display, LCD display, projection displays, or the like. Likewise, any similar type of memory, other than memory 125, may be used. Other interface apparatus, in addition to the component interfaces, may also be used including alphanumeric keypads, other key information or any pointing devices such as a mouse, trackball, stylus, cursor or direction key.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of this invention.

What is claimed is:

1. A method for providing an alert based on freeform input received from a user, comprising the steps of:
    (a) accepting a freeform input, said input containing message information and a time reference;
    (b) extracting said message information and said time reference from said freeform input;
    (c) providing an alert responsive to said time information.

2. The method described in claim 1, wherein said step of accepting an input includes the step of scanning a document containing at least one freeform input.

3. The method described in claim 1, wherein said step of accepting an input includes the step of receiving said freeform input via a pen-based computer system.

4. The method described in claim 1, wherein said step of accepting an input includes the step of receiving said freeform input via a touch-screen computer system.

5. The method described in claim 1, wherein said step of extracting includes the step of locating at least one annotation.

6. The method described in claim 5, wherein said step of extracting includes the step of annotation lifting.

7. The method described in claim 1, wherein said step of providing an alert includes the step of transmitting a signal via a telephone.

8. The method described in claim 1, wherein said step of providing an alert includes the step of transmitting a signal via a pager.

9. The method described in claim 1, wherein said step of providing an alert includes the step of alerting a user via an audio signal.

10. The method described in claim 1, further including the step of displaying said message on a video display.

11. The method described in claim 1, wherein said step of providing an alert includes the step of transmitting said message via a facsimile device.

12. The method described in claim 1, wherein said step of providing an alert includes the step of transmitting said message via a computer network.

13. A system for providing a reminder message based on a freeform input, said system comprising:
    (a) a receiving means for receiving a freeform input containing message information and a time reference for delivery of said message;
    (b) a processing means coupled to said receiving means for extracting said message information and said time reference from said freeform input; and
    (c) a alerting means for providing said message to the user in response to said time reference.

14. The system as defined in claim 13, wherein said receiving means includes a facsimile device.

15. The system as defined in claim 13, wherein said receiving means includes a digital scanner.

16. The system as defined in claim 13, wherein said receiving means includes means for reading input from a stylus.

17. The system as defined in claim 13, wherein said receiving means includes a touch-screen computer system.

18. The system as defined in claim 13 wherein said processing means includes a field finding means.

19. The system as defined in claim 13 wherein said processing means includes an annotation lifting means.

20. The system as defined in claim 13, wherein said alerting means includes means for displaying said reminder message on a video display.

21. The system as defined in claim 13, wherein said alerting means includes means for generating an audio signal.

22. The system as defined in claim 13, wherein said alerting means includes means for delivering said reminder message via a telephone.

23. The system as defined in claim 13, wherein said alerting means includes means for delivering said reminder message via a pager.

24. A computer readable storage medium for use with computer apparatus, said medium including computer instructions which, when executed by said computer apparatus:
    (a) receive a freeform input from a user, said input including message information and a time reference;
    (b) extract said message information and said time reference from said freeform input;
    (c) construct a reminder message based on said message information; and
    (d) transmit said reminder message responsive to said time reference.

25. A system for providing a reminder message based on a freeform input, said system comprising:
    (a) a first interface for receiving a scanned image of a freeform input, said freeform input containing message information and a time reference for delivery of said message;
    (b) a processor coupled to said first interface, said processor responsive to said first interface and programmed to extract said message information and said time reference from scanned image of said freeform input and to create a reminder message based on said message information; and
    (c) a second interface for transmitting said reminder message in response to said time reference, said second interface coupled to said processor.

26. A pen-based computer system for providing a reminder message based on a freeform digital ink input, said system comprising:
    (a) a first interface for receiving a freeform input, said freeform digital ink input containing message information and a time reference for delivery of said message;
    (b) a processor coupled to said first interface, said processor responsive to said first interface and programmed to extract said message information and said time reference from said freeform digital ink input and to create a reminder message based on said message information; and (c) a second interface for transmitting said reminder message in response to said time reference, said second interface coupled to said processor.

27. The method of claim 1, wherein said freeform input is a handwritten mark.

28. The method of claim 27, wherein said handwritten mark is made on a touchscreen.

29. The method of claim 27, wherein said handwritten mark is made on a piece of paper and said paper is scanned.

30. The method of claim 1, wherein said freeform input does not include structured data including ASCII formatted data.

* * * * *

UNITED STATES PATENT AND TRADEMARK OFFICE
CERTIFICATE OF CORRECTION

PATENT NO. : 6,587,895 B1
DATED : July 1, 2003
INVENTOR(S) : Golovchinsky et al.

It is certified that error appears in the above-identified patent and that said Letters Patent is hereby corrected as shown below:

<u>Title page,</u>
Item [73], Assignee, should read as follows:

-- [73] Assignees: Fuji Xerox Company, Ltd. (Japan)
       Xerox Corporation, Stamford, CT (US) --

Signed and Sealed this

Thirteenth Day of April, 2004

JON W. DUDAS
*Acting Director of the United States Patent and Trademark Office*